United States Patent
Hikichi (10) Patent No.: US 12,202,321 B2
(45) Date of Patent: Jan. 21, 2025

(54) BELT MOLDING

(71) Applicant: TOKAI KOGYO CO., LTD., Obu (JP)

(72) Inventor: Shinji Hikichi, Obu (JP)

(73) Assignee: TOKAI KOGYO CO., LTD., Obu (JP)

( * ) Notice: Subject to any disclaimer, the term of this patent is extended or adjusted under 35 U.S.C. 154(b) by 0 days.

(21) Appl. No.: 18/281,988

(22) PCT Filed: Mar. 15, 2022

(86) PCT No.: PCT/JP2022/011749
§ 371 (c)(1),
(2) Date: Sep. 14, 2023

(87) PCT Pub. No.: WO2022/196706
PCT Pub. Date: Sep. 22, 2022

(65) Prior Publication Data
US 2024/0181856 A1 Jun. 6, 2024

(30) Foreign Application Priority Data
Mar. 18, 2021 (JP) ................. 2021-044272

(51) Int. Cl.
*B60J 10/76* (2016.01)
*B60J 5/04* (2006.01)
*B60J 10/27* (2016.01)

(52) U.S. Cl.
CPC ............. *B60J 10/76* (2016.02); *B60J 5/0411* (2013.01); *B60J 10/27* (2016.02)

(58) Field of Classification Search
CPC ........... B60J 10/76; B60J 10/27; B60J 5/0411
(Continued)

(56) References Cited

U.S. PATENT DOCUMENTS 4,949,507 A * 8/1990 Vaughan ................. B60J 10/21
49/377
6,128,859 A * 10/2000 Vance .................... B60J 10/265
49/440
(Continued)

FOREIGN PATENT DOCUMENTS

CN 113147338 A * 7/2021
CN 114368266 A * 4/2022 ............. B60J 10/20
(Continued)

OTHER PUBLICATIONS

May 31, 2022 International Search Report issued in International Patent Application No. PCT/JP2022/011749.
(Continued)

*Primary Examiner* — Jerry E Redman
(74) *Attorney, Agent, or Firm* — Oliff PLC (57) ABSTRACT

The belt molding has a vehicle interior side wall portion, a vehicle interior side lip, a return lip, and a decorative lip. The vehicle interior side lip protrudes from the vehicle interior side wall portion toward a vehicle interior side. The return lip is folded back from a distal end side of the vehicle interior side lip toward the vehicle interior side wall portion. The decorative lip protrudes toward a vehicle interior side from a portion of the vehicle interior side wall portion, which is above the vehicle interior side lip. On a vehicle interior side surface of the vehicle interior side wall portion, at least one first convex portion is formed at a position between the vehicle interior side lip and the decorative lip in a cross-section.

6 Claims, 5 Drawing Sheets

(58) Field of Classification Search
USPC .................................................. 49/374, 377
See application file for complete search history.

(56) References Cited

U.S. PATENT DOCUMENTS

| | | | | |
|---|---|---|---|---|
| 6,422,571 | B1* | 7/2002 | Keeney | B60J 10/75 |
| | | | | 277/921 |
| 8,789,313 | B2* | 7/2014 | Roll | B60J 10/75 |
| | | | | 49/377 |
| 8,881,463 | B2* | 11/2014 | MacDonald | B60J 10/18 |
| | | | | 49/377 |
| 9,003,709 | B2* | 4/2015 | Patterson | B60J 10/36 |
| | | | | 49/377 |
| 9,840,207 | B2* | 12/2017 | Blottiau | B29C 45/0003 |
| 11,021,048 | B2* | 6/2021 | Vetter | B60Q 1/2661 |
| 11,110,783 | B2* | 9/2021 | Sävström | B60J 10/75 |
| 11,697,333 | B2* | 7/2023 | Cho | B60J 10/16 |
| | | | | 296/39.1 |
| 2005/0126077 | A1* | 6/2005 | Cittadini | B60J 10/38 |
| | | | | 49/377 |
| 2010/0011671 | A1* | 1/2010 | Gentemann | B60J 10/75 |
| | | | | 49/490.1 |
| 2017/0225556 | A1 | 8/2017 | Alhof et al. | |
| 2018/0222301 | A1 | 8/2018 | Harada et al. | |
| 2019/0232770 | A1* | 8/2019 | Otsuka | B60J 10/16 |
| 2020/0338969 | A1* | 10/2020 | Cho | B29C 66/7422 |
| 2024/0083227 | A1* | 3/2024 | Choi | B60J 10/30 |
| 2024/0181856 | A1* | 6/2024 | Hikichi | B60J 5/0411 |

FOREIGN PATENT DOCUMENTS

| | | | | |
|---|---|---|---|---|
| CN | 114537104 | A * | 5/2022 | ............ B60J 10/244 |
| CN | 116985613 | A * | 11/2023 | |
| JP | 2010-521349 | A | 6/2010 | |
| JP | 2014-177210 | A | 9/2014 | |
| JP | 2016-068661 | A | 5/2016 | |
| WO | WO-2016052388 | A1 * | 4/2016 | .............. B60J 10/27 |

OTHER PUBLICATIONS

May 31, 2022 Written Opinion issued in International Patent Application No. PCT/JP2022/011749.

* cited by examiner

BELT MOLDING

TECHNICAL FIELD

The present invention relates to an elongated belt molding that is attached along an upper edge of a door panel of a vehicle door and seals between the door panel and a window pane.

BACKGROUND ART

In general, for a vehicle door that opens/closes an opening of a vehicle body, a window opening is provided, and a window pane (window glass) that opens/closes the window opening is installed to be able to move up and down. In addition, an elongated belt molding that seals between a door panel of the vehicle door and the window pane is attached to an upper edge of a door panel of the vehicle door. When the window pane is moved up and down, the belt molding comes into sliding contact with the window pane, so that foreign matters (water droplets, grit and dust, etc.) adhering to a surface of the window pane are wiped off (for example, refer to Patent Literature 1).

For example, in the related art described in Patent Literature 1, the belt molding has a vehicle interior side seal lip 32 that contacts a window pane and a decorative seal lip 31 that protrudes from an upper end of the belt molding. These seal lips rub against each other while closing a space formed between both the seal lips when the window pane moves up from an open position to a closed position.

CITATION LIST

Patent Literature

Patent Literature 1: JP2010-521349A (FIGS. 2 to 4, etc.)

SUMMARY OF INVENTION

Technical Problem

However, in the related art disclosed in Patent Literature 1, when closing (moving up) the window pane, frictional force is generated if a distal end portion of the vehicle interior side seal lip rubs against a lower surface of the decorative seal lip. As a result, there is a problem in that the distal end portion of the vehicle interior side seal lip becomes difficult to bend smoothly and the load when closing the window pane increases.

The present invention has been made in view of the above situations, and an object thereof is to provide a belt molding capable of preventing an increase in load when closing a window pane.

Solution to Problem

In order to solve the above problem, the invention described in means 1 is an elongated belt molding to be attached along an upper edge of a door panel of a vehicle door and to seal between the door panel and a window pane, the belt molding including: a vehicle exterior side wall portion and a vehicle interior side wall portion facing each other in a cross-section, a top wall portion connecting the side wall portions, a vehicle interior side lip protruding from the vehicle interior side wall portion toward a vehicle interior side, a return lip folded back from a distal end side of the vehicle interior side lip and protruding toward the vehicle interior side wall portion, and a decorative lip protruding toward the vehicle interior side from a portion of the vehicle interior side wall portion, which is above the vehicle interior side lip, in which on a surface of the vehicle interior side wall portion on the vehicle interior side, at least one first convex portion is formed at a position between the vehicle interior side lip and the decorative lip, in a cross-section, and in which when the vehicle interior side lip bends toward a vehicle exterior side, a groove formed between the vehicle interior side lip and the vehicle interior side wall portion is occluded by the return lip and the decorative lip and the return lip is capable of sliding against the first convex portion.

Therefore, according to the invention described in means 1, when the vehicle interior side lip bents toward the vehicle exterior side in association with closing of a window pane, since the return lip on the distal end side of the vehicle interior side lip slides in contact with an apex of the first convex portion formed on the vehicle interior side wall portion, a contact area is smaller than in the case of sliding in surface contact with the surface of the vehicle interior side wall portion on the vehicle interior side. Along with this, since frictional force generated between the return lip and the vehicle interior side wall portion is also reduced, the vehicle interior side lip can be smoothly bent, and therefore, an increase in load when closing the window pane can be prevented.

Here, examples of a material for forming the elongated belt molding may include thermoplastic elastomer, thermoplastic resin, rubber, and the like. As the thermoplastic elastomer, olefin-based thermoplastic elastomer (TPO), styrene-based elastomer (TPS), or the like is favorably used. In addition, as the thermoplastic resin, vinyl chloride resin (PVC resin), polypropylene resin (PP resin), or the like is favorably used. Further, as the rubber, ethylene propylene diene rubber (EPDM) or the like is favorably used.

In order to solve the above problem, the invention described in means 2 is an elongated belt molding to be attached along an upper edge of a door panel of a vehicle door and to seal between the door panel and a window pane, the belt molding including: a vehicle exterior side wall portion and a vehicle interior side wall portion facing each other in a cross-section, a top wall portion connecting the side wall portions, a vehicle interior side lip protruding from the vehicle interior side wall portion toward a vehicle interior side, a return lip folded back from a distal end side of the vehicle interior side lip and protruding toward the vehicle interior side wall portion, and a decorative lip protruding toward the vehicle interior side from a portion of the vehicle interior side wall portion, which is above the vehicle interior side lip, in which at least one of an exterior side surface of the return lip and a lower surface of the decorative lip is covered with a sliding material, in which the sliding material for covering the exterior side surface of the return lip has a hardness that is about the same as that of a material for forming the vehicle interior side lip, in which the sliding material for covering the lower surface of the decorative lip has a hardness that is about the same as that of a material for forming the decorative lip, and in which when the vehicle interior side lip bends toward a vehicle exterior side, a groove formed between the vehicle interior side lip and the vehicle interior side wall portion is occluded by the return lip and the decorative lip and the exterior side surface of the return lip is capable of sliding against the lower surface of the decorative lip via the sliding material.

Therefore, according to the invention described in means 2, when the vehicle interior side lip bents toward the vehicle exterior side in association with closing of a window pane, the exterior side surface of the return lip on the distal end side of the vehicle interior side lip and the lower surface of the decorative lip protruding from the vehicle interior side wall portion slide via the sliding material. Thereby, the frictional force generated between the return lip and the decorative lip is smaller, as compared with a case where the exterior side surface of the return lip and the lower surface of the decorative lip slide not via the sliding member. As a result, the vehicle interior side lip can be smoothly bent, and therefore, an increase in load when closing the window pane can be prevented. In addition, the sliding material for covering the exterior side surface of the return lip has a hardness that is about the same as that of the material for forming the vehicle interior side lip, and the sliding material for covering the lower surface of the decorative lip has a hardness that is about the same as that of the material for forming the decorative lip. For this reason, even when the sliding material is covered, the original flexibility of each lip is not impaired.

Regarding means 2, in the invention described in means 3, on a surface of the vehicle interior side wall portion on the vehicle interior side, at least one first convex portion is formed at a position between the vehicle interior side lip and the decorative lip, in a cross-section, and when the vehicle interior side lip bends toward a vehicle exterior side, the return lip is capable of sliding against the first convex portion.

Therefore, according to the invention described in means 3, when the vehicle interior side lip bents toward the vehicle exterior side, since the return lip on the distal end side of the vehicle interior side lip slides in contact with an apex of the first convex portion formed on the vehicle interior side wall portion, a contact area is smaller than in the case of sliding in surface contact with the surface of the vehicle interior side wall portion on the vehicle interior side. Along with this, since frictional force generated between the return lip and the vehicle interior side wall portion is also reduced, the vehicle interior side lip can be bent more smoothly.

Regarding means 1 or 3, in the invention described in means 4, a concave portion is formed at a lower-side portion of the first convex portion on the vehicle interior side wall portion.

Therefore, according to the invention described in means 4, since the first convex portion increases as high as the concave portion is formed, it is possible to make it difficult for the return lip to contact the surface of the vehicle interior side wall portion on the vehicle interior side.

Regarding one of means 1 to 4, in the invention described in means 5, at least one second convex portion is formed on a lower surface of the decorative lip in a cross-section.

Therefore, according to the invention described in means 5, when the vehicle interior side lip bents toward a vehicle exterior side, the return lip on the distal end side of the vehicle interior side lip slides in contact with the second convex portion and is guided toward the vehicle interior side wall portion. Therefore, the frictional force is smaller than in the case of sliding in contact with the lower surface of the decorative lip as a whole. Thereby, the return lip can be smoothly guided toward the vehicle interior side wall portion.

Regarding any one of means 1 to 5, in the invention described in means 6, a thickness on a root side of the return lip is smaller than a thickness on a distal end side of the return lip.

Therefore, according to the invention described in means 6, the return lip can be made to easily bend by thinning the root side, which is a bent portion of the return lip.

Regarding any one of means 1 to 6, in the invention described in means 7, a distal end portion of the return lip is curved toward an inside of the groove, and the return lip has a curvature that is greater at the distal end portion than at a proximal end portion.

Therefore, according to the invention described in means 7, when the vehicle interior side lip bends toward the vehicle exterior side, the return lip can be folded and bent smoothly without being caught (pressed against by the vehicle interior side wall portion.

Advantageous Effects of Invention

As described above, according to the invention described in claims 1 to 7, it is possible to prevent an increase in load when closing the window pane.

DESCRIPTION OF EMBODIMENTS

Hereinafter, one embodiment of the present invention will be described in detail with reference to the drawings.

Figure 1:
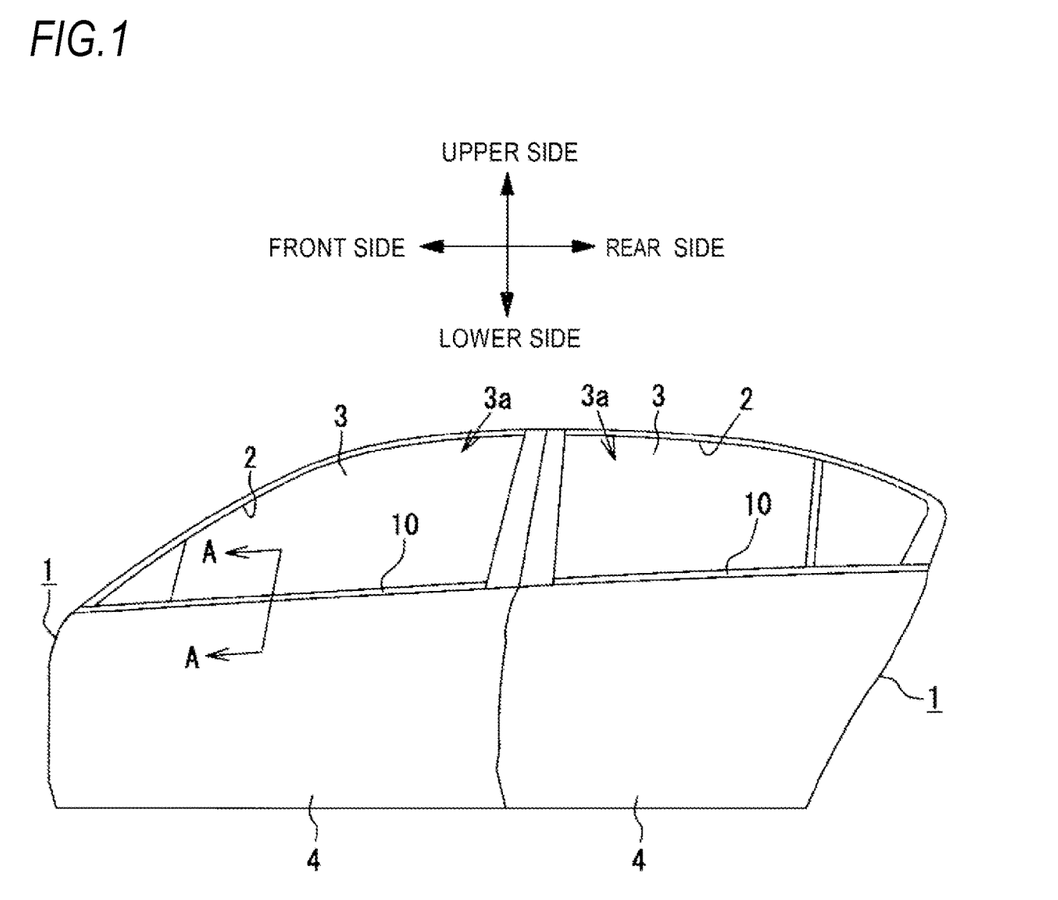
FIG. 1 is a side view showing a vehicle body according to the present embodiment.

As shown in FIG. 1, for a vehicle door 1 that opens/closes an opening of a vehicle body, a window opening 2 is provided, and a window pane 3 (window glass) that opens/closes the window opening 2 is installed to be able to move up and down. To the vehicle door 1, an elongated belt molding 10 is attached along an upper edge of a door panel 4 of the vehicle door 1 (in other words, a lower edge of the window opening 2). The door panel 4 of the present embodiment is a door outer panel, and the belt molding 10 of the present embodiment is an outer belt molding that seals between the door panel 4 and the window pane 3. Note that foreign matters (water droplets, grit and dust, etc.) adhering to a surface 3a of the window pane 3 are wiped off by the belt molding 10 when the window pane 3 moves up and down.

In addition, FIG. 1 shows a state in which the belt molding 10 is attached to a front door and a rear door on a left side of the vehicle body, but a similar belt molding 10 is also attached to a front door and a rear door on a right side of the vehicle body. Therefore, in the present embodiment, only the belt molding 10 attached to the front door on the left side is described, and the description of the belt molding 10 attached to the rear door on the left side, the front door on the right side, and the rear door on the right side is omitted.

Figure 2:
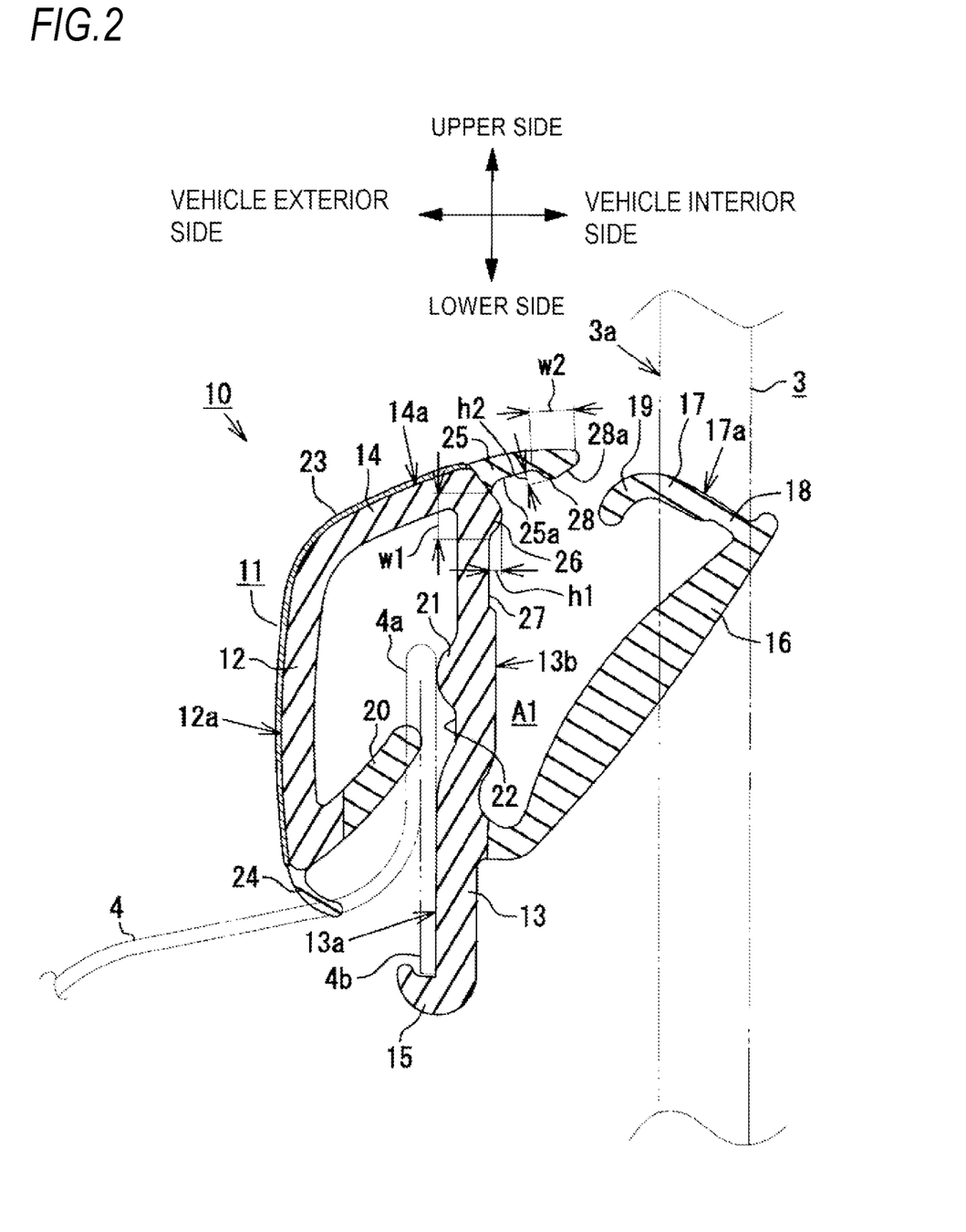
FIG. 2 is a cross-sectional view taken along an A-A line in FIG. 1.

In addition, the belt molding 10 of the present embodiment is an extrusion molded product formed using olefin-based thermoplastic elastomer (TPO), and is uniformly formed over the entire longitudinal direction. As shown in FIG. 2, the belt molding 10 has a body part 11 having a substantially U-shape in a cross-section. The body part 11 has a vehicle exterior side wall portion 12 and a vehicle interior side wall portion 13 facing each other in a cross-section, and a top wall portion 14 connecting upper edges of the side wall portions 12 and 13 each other. On the other hand, a distal end portion (upper edge portion) of the door panel 4 is processed (hemming) into a folded state to form a flange 4a. Then, the belt molding 10 is attached to the flange 4a by inserting the flange 4a between the vehicle exterior side wall portion 12 and the vehicle interior side wall portion 13.

Figure 3:
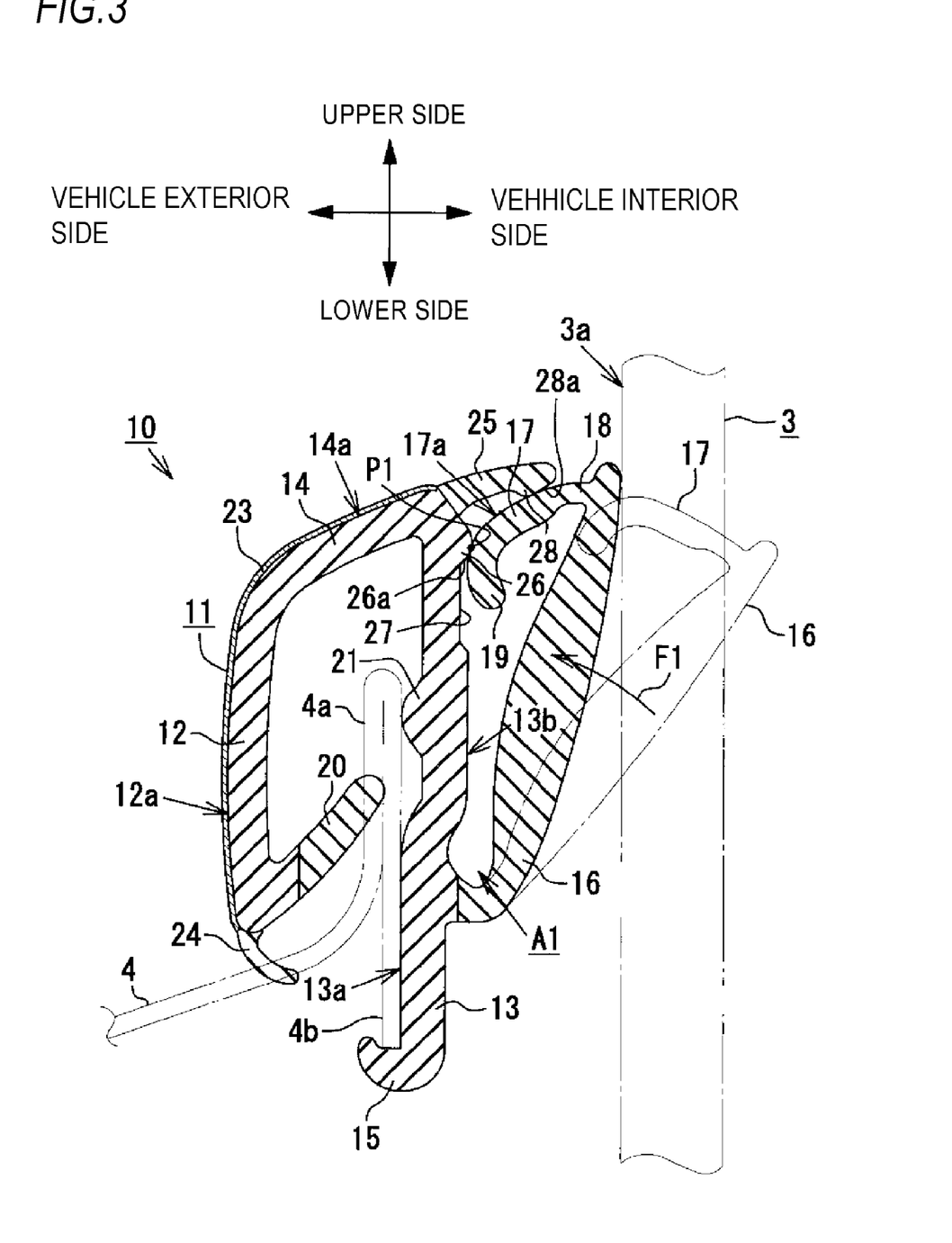
FIG. 3 is a cross-sectional view showing a belt molding when a window pane is closed.

In addition, an engaging portion 15 bent toward a vehicle exterior side is provided at a lower end portion of the vehicle interior side wall portion 13. In a state in which the belt molding 10 is attached to the door panel 4, the engaging portion 15 is engaged by a distal end edge (lower end edge) of a folded-back portion 4b of the flange 4a. In addition, the vehicle interior side wall portion 13 is provided with a vehicle interior side lip 16 protruding from the vehicle interior side wall portion 13 toward the window pane 3 side (vehicle interior side). The vehicle interior side lip 16 protrudes obliquely upward from a lower-side portion of the vehicle interior side wall portion 13 in an initial state (refer to FIG. 2). The vehicle interior side lip 16 is adapted to bend toward the vehicle exterior side (vehicle interior side wall portion 13 side) by rotating about a root portion of the vehicle interior side lip 16 in a direction of an arrow F1 (refer to FIG. 3). Note that thicknesses of the root portion (proximal end portion) and the distal end portion of the vehicle interior side lip 16 is smaller than a thickness of a central portion of the vehicle interior side lip 16.

As shown in FIG. 2, the vehicle interior side lip 16 is provided with a return lip 17 that is folded back from the distal end side of the vehicle interior side lip 16 and protrudes toward the vehicle interior side wall portion 13 side (vehicle exterior side). The return lip 17 protrudes from the distal end portion of the vehicle interior side lip 16, specifically, from a location slightly closer to the proximal end (root) than the distal end of the vehicle interior side lip 16. Note that a thickness on a root side of the return lip 17 is smaller than a thickness on a distal end side of the return lip 17. A distal end portion 19 of the return lip 17 is curved toward an inside of a groove A1 formed between the vehicle interior side lip 16 and the vehicle interior side wall portion 13, and the return lip 17 has a curvature that is greater at the distal end portion 19 than at a proximal end portion 18.

In addition, the vehicle exterior side wall portion 12 is provided with a holding lip 20 protruding toward the vehicle interior side wall portion 13 side (vehicle interior). The holding lip 20 protrudes obliquely upward from a lower end portion of the vehicle exterior side wall portion 12. On the other hand, a holding convex portion 21 is formed at a position, which is substantially a central portion of the vehicle interior side wall portion 13, on a vehicle exterior side surface 13a of the vehicle interior side wall portion 13. The holding convex portion 21 of the present embodiment is an elongated protrusion extending along a longitudinal direction (inward direction in FIG. 2) of the belt molding 10 and formed over the entire longitudinal direction of the belt molding 10. The holding lip 20 and the holding convex portion 21 are adapted to sandwich the flange 4a while being in elastic contact with the flange 4a in a state where the belt molding 10 is attached to the door panel 4. In addition, a vehicle exterior side concave portion 22 is formed at a lower-side portion of the holding convex portion 21 on the vehicle interior side wall portion 13, and a lower-side region of the vehicle exterior side concave portion 22 on the vehicle exterior side surface 13a is in contact with a side surface of the folded-back portion 4b of the flange 4a.

In addition, as shown in FIG. 2, a vehicle exterior side surface 12a of the vehicle exterior side wall portion 12 and an exterior side (upper-side) surface 14a of the top wall portion 14 are covered with a covering portion 23 with good appearance. Further, a vehicle exterior side lip 24 that occludes a gap between the belt molding 10 and the door panel 4 in the state where the belt molding 10 is attached to the door panel 4 is provided at a location where the vehicle exterior side wall portion 12 and the holding lip 20 are connected. The vehicle exterior side lip 24 protrudes downward from a lower end portion of the vehicle exterior side wall portion 12, and a distal end of the vehicle exterior side lip 24 is curved toward the vehicle interior side.

In addition, a decorative lip 25 protruding toward the vehicle interior side is provided at a location of the vehicle interior side wall portion 13 above the vehicle interior side lip 16 and serving as a connection portion with the top wall portion 14. The decorative lip 25 is gently curved downward and has such a length that it does not come into contact with the window pane 3.

As shown in FIG. 2, on the vehicle interior side surface 13b of the vehicle interior side wall portion 13, one first convex portion 26 is formed at a position between the vehicle interior side lip 16 and the decorative lip 25 in a cross-section. The first convex portion 26 of the present embodiment is an elongated protrusion arranged right below the decorative lip 25 and extending along the longitudinal direction (depth direction in FIG. 2) of the belt molding 10. The first convex portion 26 is formed over the entire longitudinal direction of the belt molding 10. Further, the first convex portion 26 protrudes from the surface 13b of the vehicle interior side wall portion 13, and has a substantially triangular shape in a cross-section. More specifically, the first convex portion 26 has a protruding height h1 smaller than a width w1 and has a gentle shape without corners. Further, a vehicle interior side concave portion 27 is formed at a portion below the first convex portion 26 on the vehicle interior side wall portion 13.

In addition, as shown in FIG. 2, one second convex portion 28 is formed on a lower surface 25a of the decorative lip 25 in a cross-section. The second convex portion 28 of the present embodiment is an elongated protrusion arranged at a distal end portion of the decorative lip 25 and extending along the longitudinal direction of the belt molding 10. The second convex portion 28 is formed over the entire longitudinal direction of the belt molding 10. Further, the second convex portion 28 protrudes from the lower surface 25a of the decorative lip 25, and has a substantially triangular shape in a cross-section. More specifically, the second convex portion 28 has a protruding height h2 smaller than a width w2, and has a gentle shape without corners. On a surface of the second convex portion 28, a region on the distal end side of the decorative lip 25 serves as a guide surface 28a for guiding the return lip 17 into the groove A1.

Note that the body part 11 (vehicle exterior side wall portion 12, vehicle interior side wall portion 13, and top wall portion 14) has a durometer hardness (type D) of 70 degrees defined in JIS K7215. On the other hand, the vehicle interior side lip 16, the return lip 17, the holding lip 20, the vehicle exterior side lip 24, and the decorative lip 25 are made of a material that is softer and more elastically deformable than the body part 11. Each of the lips 16, 17, 20, 24 and 25 has a durometer hardness (type A) of 70 degrees defined in JIS K7215.

In addition, the belt molding 10 is formed by co-extruding the body part 11 and the respective lips 16, 17, 20, 24 and 25. Then, secondary processing for attaching the belt molding 10 to the vehicle door 1, for example, press working, cutting or the like is performed on both ends of the belt molding 10 in the longitudinal direction.

Next, a method of using the belt molding 10 will be described.

For example, when the window opening 2 is in an open state as the window pane 3 is located in an open position (lower end position) (refer to FIG. 2), the vehicle interior side lip 16 of the belt molding 10 is in a state where it is not in contact with the window pane 3.

Then, when the window opening 2 is displaced to a closed state as the window pane 3 moves up from the open position to a closed position (upper end position) (refer to FIG. 3), a surface 3a of the window pane 3 moving up comes into contact with the distal end of the vehicle interior side lip 16. Further, as the window pane 3 continues to move up, the vehicle interior side lip 16 is pushed against the window pane 3 and is bent toward the vehicle interior side wall portion 13 side (vehicle exterior side) (refer to a direction of an arrow F1 in FIG. 3). Note that, at this time, the vehicle interior side lip 16 comes into sliding contact with the window pane 3, so that foreign matters adhering to the surface 3a of the window pane 3 are wiped off.

Further, when the vehicle interior side lip 16 is bent toward the vehicle interior side wall portion 13 side (vehicle exterior side), an exterior side surface 17a of the return lip 17 protruding from the vehicle interior side lip 16 comes into contact with the guide surface 28a of the second convex portion 28 provided on the decorative lip 25 protruding from the vehicle interior side wall portion 13. Then, the return lip 17 is guided obliquely downward (into the groove A1 formed between the vehicle interior side lip 16 and the vehicle interior side wall portion 13) as the exterior side surface 17a slides against the guide surface 28a of the second convex portion 28 (refer to FIG. 3). Further, the exterior side surface 17a of the return lip 17 slides in point contact with an apex P1 of the first convex portion 26 provided on the vehicle interior side wall portion 13, and then slides against a surface 26a of the first convex portion 26 below the apex P1 (refer to FIG. 3). As a result, the opening on an upper side of the groove A1 is occluded by the return lip 17 and the vehicle interior side wall portion 13 (and the decorative lip 25). Note that due to deviation of a position of the belt molding 10 (specifically, deviation of a position of the return lip 17, the decorative lip 25, or the like) or deviation of a position of the window pane 3, the return lip 17 does not necessarily slide against the surface 26a of the first convex portion 26. For example, the return lip 17 may contact only the apex P1 of the first convex portion 26, or the return lip 17 may not contact the first convex portion 26 itself.

Therefore, according to the present embodiment, the following effects can be obtained.

(1) In the belt molding 10 of the present embodiment, when the vehicle interior side lip 16 bends toward the vehicle exterior side in association with closing of the window pane 3, the return lip 17 on the distal end side of the vehicle interior side lip 16 slides in contact with the apex (apex P1) of the first convex portion 26 formed on the vehicle interior side wall portion 13. For this reason, a contact area between the return lip 17 and the vehicle interior side wall portion 13 is smaller, as compared with a case in which the return lip 17 slides in surface contact with the vehicle interior side surface 13b of the vehicle interior side wall portion 13. Along with this, since frictional force generated between the return lip 17 and the vehicle interior side wall portion 13 is also reduced, the vehicle interior side lip 16 can be smoothly bent, and therefore, an increase in load when closing the window panel 3 can be prevented.

(2) In addition, in the present embodiment, also when the vehicle interior side lip 16 returns to its initial state (refer to FIG. 2) (moves toward the vehicle interior side) as the window pane 3 is opened, the return lip 17 slides in contact with the apex of the first convex portion 26. For this reason, a contact area is smaller, as compared with a case in which the return lip 17 slides in surface contact with the vehicle interior side surface 13b of the vehicle interior side wall portion 13. Along with this, since frictional force generated between the return lip 17 and the vehicle interior side wall portion 13 is also reduced, the vehicle interior side lip 16 can be caused to easily return to the initial state, and therefore, the performance of wiping off foreign matters adhering to the surface 3a of the window pane 3 can be maintained favorably.

(3) The first convex portion 26 and the second convex portion 28 of the present embodiment are each an elongated protrusion extending along the longitudinal direction (front-rear direction in FIG. 1) of the belt molding 10 and formed over the entire longitudinal direction of the belt molding 10. For this reason, when forming the belt molding 10 by extrusion molding, the first convex portion 26 and the second convex portion 28 can be formed simultaneously with the body part 11, each of the lips 16, 17, 20, 24 and 25, and the like. In addition, when the window pane 3 is closed, the groove A1 is occluded by the return lip 17 and the vehicle interior side wall portion 13 (and the decorative lip 25), so foreign matters can be prevented from entering the groove A1. Furthermore, when the window pane 3 is closed, occurrence of a wind noise that is caused by air entering the groove A1 can be prevented.

Note that the above embodiment may be modified as follows.

In the above embodiment, one first convex portion 26 is formed at the position between the vehicle interior side lip 16 and the decorative lip 25 in a cross-section (refer to FIG. 2) on the vehicle interior side surface 13b of the vehicle interior side wall portion 13. However, two or more first convex portions 26 may be formed. For example, although the first convex portion 26 is formed immediately below the decorative lip 25 in FIG. 2, another first convex portion 26 may be further formed at a position below the position in FIG. 2 (specifically, a position on the surface 13b between the first convex portion 26 and the root portion of the vehicle interior side lip 16) if the position is a position where the return lip 17 is capable of sliding.

In the above embodiment, one second convex portion 28 is formed on the lower surface 25a of the decorative lip 25 in a cross-section (refer to FIG. 2). However, two or more second convex portions 28 may be formed. For example, although the second convex portion 28 is formed at the distal end portion of the decorative lip 25 in FIG. 2, another second convex portion 28 may be further formed on the proximal end portion side of the decorative lip 25.

The first convex portion 26 and the second convex portion 28 in the above embodiment each have a substantially triangular shape in a cross-section, but may each have another shape such as a substantially rectangular shape in a cross-section and a substantially semi-circular shape in a cross-section.

The first convex portion 26 and the second convex portion 28 of the present embodiment are each an elongated protrusion extending along the longitudinal direction (front-rear direction in FIG. 1) of the belt molding 10 and formed over the entire longitudinal direction of the belt molding 10. However, the first convex portion 26 and the second convex portion 28 may each consist of a plurality of protrusions arranged along the longitudinal direction of the belt molding 10 or a plurality of short elongated protrusions arranged along the longitudinal direction of the belt molding 10.

Figure 4:
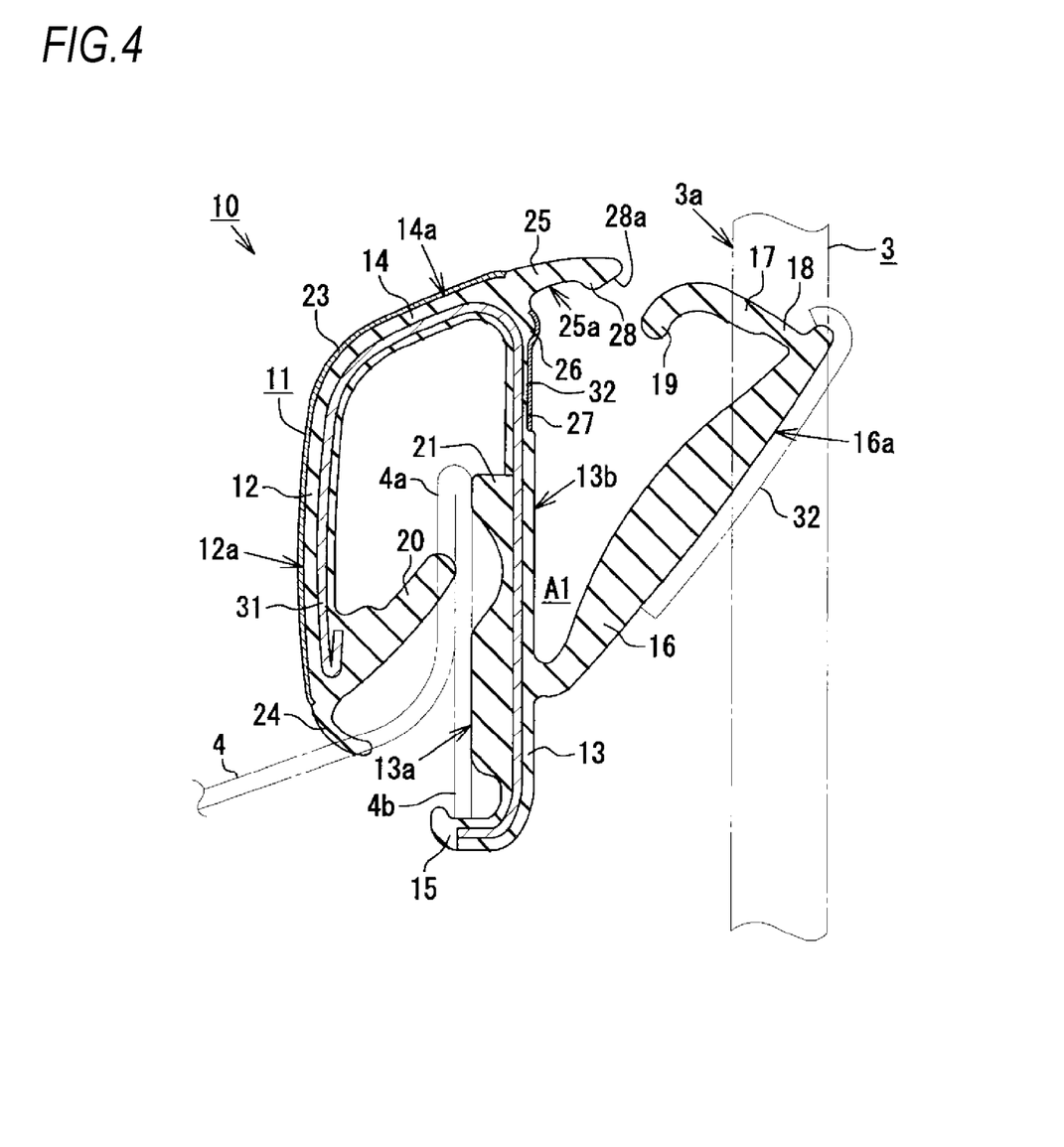
FIG. 4 is a cross-sectional view showing a belt molding in another embodiment.

As shown in FIG. 4, the body part 11 may be formed of a relatively soft material (e.g., olefin-based thermoplastic elastomer (TPO) having a durometer hardness (type A) of 70 degrees defined in JIS K7215), and a core material 31 such as a metal plate may be embedded in the body part 11 to impart rigidity. In addition, a surface of the first convex portion 26 may be covered with a covering portion 32 made of a material (e.g., olefine-based thermoplastic elastomer having a durometer hardness (type D) of 70 degrees defined in JIS K7215) that is easier to slide than the body part 11. In addition, the surface of the first convex portion 26 may be covered with a covering portion 32 made of a material (e.g., a material having a durometer hardness (type D) of 40 degrees defined in JIS K7215 or a material having a hardness defined in JIS A70 to 85) having a hardness equal to or greater than that of the body part 11 (e.g., the vehicle interior side wall portion 13). Note that the covering portion 32 may cover a surface of the distal end portion 19 of the return lip 17, a surface of the second convex portion 28, and the like.

Figure 5:
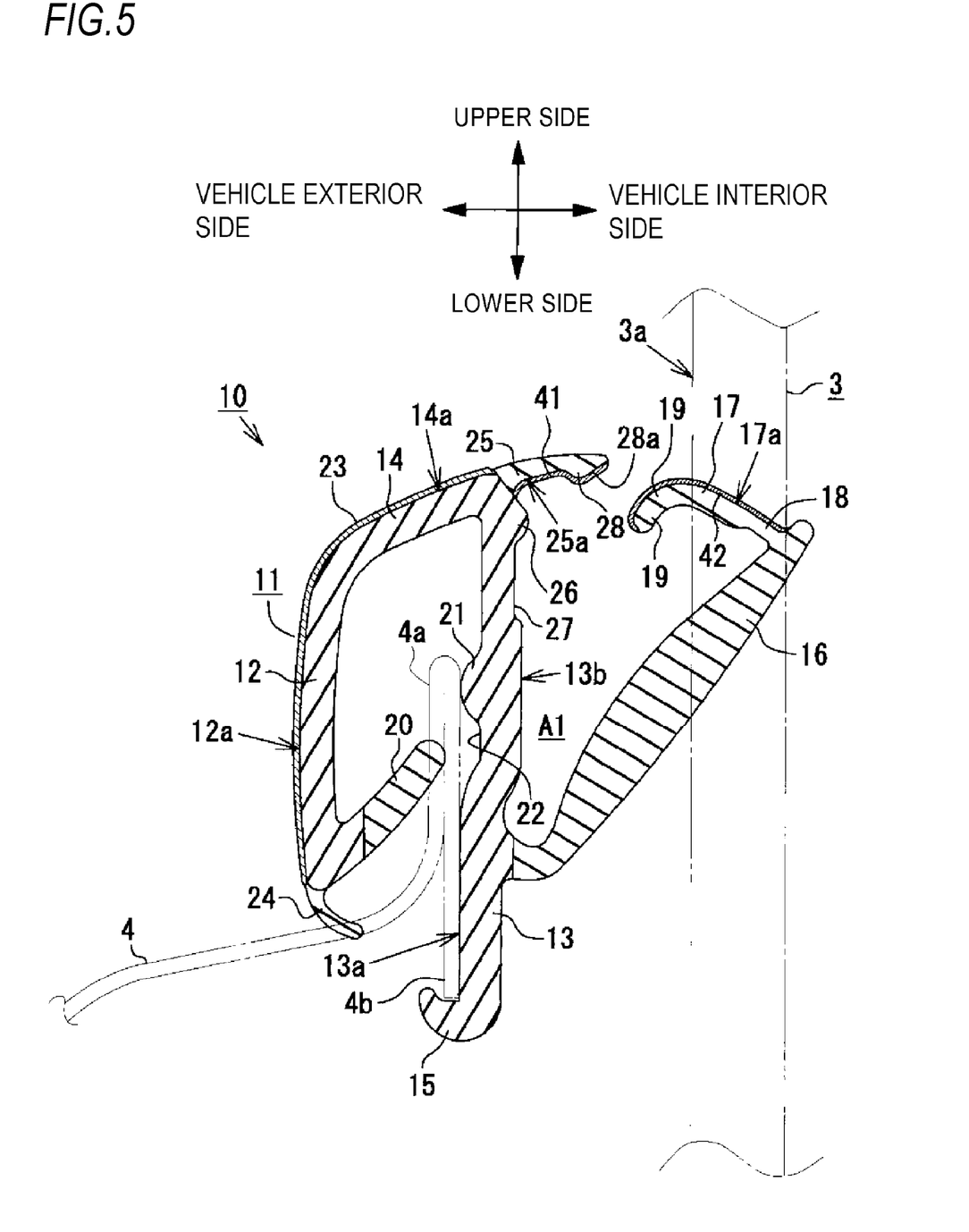
FIG. 5 is a cross-sectional view showing a belt molding in another embodiment.

As shown in FIG. 5, the exterior side surface 17a of the return lip 17 may be covered with a soft sliding material 42 (sliding material) having a hardness (for example, the hardness defined in JIS A70 to 85) that is about the same as that of the material for forming the vehicle interior side lip 16. Specifically, the soft sliding material 42 may cover all or parts of the surface of the distal end portion 19 of the return lip 17 and the surface of the proximal end portion 18, in addition to the exterior side surface 17a. Further, the lower surface 25a of the decorative lip 25 may be covered with a soft sliding material 41 (sliding material) having a hardness (for example, hardness defined in JIS A70 to 85) that is about the same as that of the material for forming the decorative lip 25. Specifically, the soft sliding material 41 may cover all or parts of the surface of the second convex portion 28 and the guide surface 28a of the second convex portion 28, in addition to the lower surface 25a of the decorative lip 25. Note that either one of the soft sliding members 41 and 42 may be omitted.

In order to prevent the return lip 17 and the first convex portion 26 or the return lip 17 and the second convex portion 28 from rubbing against each other to generate sound, at least one of the surface of the distal end portion 19 of the return lip 17, the surface of the first convex portion 26, and the surface of the second convex portion 28 may be coated with a lubricant.

Next, in addition to the technical ideas described in the claims, the technical ideas understood by the above-described embodiment are enumerated below.

(1) The belt molding according to claim 5, wherein at least one of the first convex portion and the second convex portion is an elongated protrusion extending along a longitudinal direction of the belt molding.

(2) The belt molding according to any one of claims 1 to 7, wherein a vehicle exterior side concave portion is formed at a portion below the holding convex portion on the vehicle interior side wall portion.

(3) The belt molding according to any one of claims 1 to 7, wherein a thickness of a root portion of the vehicle interior side lip is smaller than a thickness of a central portion of the vehicle interior side lip. According to this configuration, since the root portion, which is the bent portion of the vehicle interior side lip, is thinned, the vehicle interior side lip can be easily bent.

REFERENCE SIGNS LIST

1: vehicle door
3: window pane
4: door panel
10: belt molding
12: vehicle exterior side wall portion
13: vehicle interior side wall portion
13b: vehicle interior side surface of vehicle interior side wall portion
14: top wall portion
16: vehicle interior side lip
17: return lip
17a: exterior side surface of return lip
18: proximal end portion of return lip
19: distal end portion of return lip
25: decorative lip
25a: lower surface of decorative lip
26: first convex portion
27: vehicle interior side concave portion as concave portion
28: second convex portion
41, 42: soft sliding material as sliding material
A1: groove

The invention claimed is:

1. An elongated belt molding to be attached along an upper edge of a door panel of a vehicle door and to seal a gap between the door panel and a window pane, the belt molding comprising:
a vehicle exterior side wall portion and a vehicle interior side wall portion facing each other in a cross-section;
a top wall portion connecting the side wall portions;
a vehicle interior side lip protruding from the vehicle interior side wall portion toward a vehicle interior side;
a return lip folded back from a distal end side of the vehicle interior side lip and protruding toward the vehicle interior side wall portion; and
a decorative lip protruding toward the vehicle interior side from a portion of the vehicle interior side wall portion, which is above the vehicle interior side lip,
wherein on a surface of the vehicle interior side wall portion on the vehicle interior side, at least one first convex portion is formed at a position between the vehicle interior side lip and the decorative lip, in a cross-section, and
wherein when the vehicle interior side lip bends toward a vehicle exterior side, the return lip contacts the decorative lip, and the return lip is capable of sliding against the first convex portion.

2. The belt molding according to claim 1, wherein a concave portion is formed at a portion below the first convex portion on the vehicle interior side wall portion.

3. The belt molding according to claim 1, wherein at least one second concave portion is formed on a lower surface of the decorative lip in a cross-section.

4. The belt molding according to claim 1, wherein a thickness on a root side of the return lip is smaller than a thickness on a distal end side of the return lip.

5. The belt according to claim 1, wherein a distal end portion of the return lip is curved toward an inside of a groove formed between the vehicle interior side lip and the vehicle interior side wall portion, and the return lip has a curvature that is greater at the distal end portion than at a proximal end portion.

6. An elongated belt molding to be attached along an upper edge of a door panel of a vehicle door and to seal a gap between the door panel and a window pane, the belt molding comprising:
- a vehicle exterior side wall portion and a vehicle interior side wall portion facing each other in a cross-section;
- a top wall portion connecting the side wall portions;
- a vehicle interior side lip protruding from the vehicle interior side wall portion toward a vehicle interior side;
- a return lip folded back from a distal end side of the vehicle interior side lip and protruding toward the vehicle interior side wall portion; and
- a decorative lip protruding toward the vehicle interior side from a portion of the vehicle interior side wall portion, which is above the vehicle interior side lip, wherein at least one of an exterior side surface of the return lip and a lower surface of the decorative lip is covered with a sliding material, wherein the sliding material for covering the exterior side surface of the return lip has a hardness that is about the same as that of a material for forming the vehicle interior side lip, wherein the sliding material for covering the lower surface of the decorative lip has a hardness that is about the same as that of a material for forming the decorative lip, wherein when the vehicle interior side lip bends toward a vehicle exterior side, the return lip contacts the decorative lip, and the exterior side surface of the return lip is capable of sliding against the lower surface of the decorative lip via the sliding material, wherein on a surface of the vehicle interior side wall portion on the vehicle interior side, at least one first convex portion is formed at a position between the vehicle interior side lip and the decorative lip, in a cross-section, and wherein when the vehicle interior side lip bends toward the vehicle exterior side, the return lip is capable of sliding against the first convex portion.

* * * * *